United States Patent
Kurianski et al.

(10) Patent No.: US 7,747,683 B2
(45) Date of Patent: Jun. 29, 2010

(54) METHOD AND SYSTEM FOR OPERATING APPLICATIONS FOR REMOTE TERMINAL DEVICES

(75) Inventors: Shai Kurianski, Ramat Hasharon (IL); Assaf Friedler, Ramat Efal (IL)

(73) Assignee: Pike Ltd., Rosh Ha'Ayin (IL)

( * ) Notice: Subject to any disclaimer, the term of this patent is extended or adjusted under 35 U.S.C. 154(b) by 122 days.

(21) Appl. No.: 12/159,553

(22) PCT Filed: Dec. 28, 2006

(86) PCT No.: PCT/IL2006/001508
§ 371 (c)(1),
(2), (4) Date: Jun. 27, 2008

(87) PCT Pub. No.: WO2007/074464
PCT Pub. Date: Jul. 5, 2007

(65) Prior Publication Data
US 2008/0307048 A1 Dec. 11, 2008

Related U.S. Application Data

(60) Provisional application No. 60/754,290, filed on Dec. 29, 2005.

(51) Int. Cl.
*G06F 15/16* (2006.01)
(52) U.S. Cl. ............... 709/203; 709/221; 709/231; 709/246; 717/168; 717/174
(58) Field of Classification Search .......... 709/203, 709/221, 231, 246; 717/168, 174
See application file for complete search history.

(56) References Cited

U.S. PATENT DOCUMENTS 6,011,918 A * 1/2000 Cohen et al. ............... 717/106

(Continued)

FOREIGN PATENT DOCUMENTS

CA 2 330 707 7/2002

(Continued)

OTHER PUBLICATIONS

Bacon, J., et al., "Mobile Applications for Ubiquitous Environments", The ICL Systems Journal, Int'l. Computers Ltd., GB, vol. 12, No. 2, Nov. 1997, pp. 264-287, XP000833453.

(Continued)

*Primary Examiner*—Michael Won
(74) *Attorney, Agent, or Firm*—Hunton & Williams, LLP

(57) ABSTRACT

Method for allowing a user of a mobile terminal device having predetermined computational resources to remotely develop and operate upgraded content delivery applications. A client-side application and a corresponding remote application are installed on the terminal device and on a server connected to the terminal device. The remote application dynamically splits the tasks to be performed by the content delivery application between the client-side application and remote application, according to its computational resources and processes, in real-time, the content and its associated logic and input data to be delivered to the terminal device. The processed content is then transmitted to the terminal device over the data network and the content is rendered by the client-side application. The client-side application responds to inputs from the user and/or to messages from the server or further connected devices.

10 Claims, 1 Drawing Sheet

U.S. PATENT DOCUMENTS

| | | | |
|---|---|---|---|
| 6,539,428 B2 * | 3/2003 | Davies | 709/224 |
| 6,799,247 B1 * | 9/2004 | Batcher | 711/118 |
| 7,275,243 B2 * | 9/2007 | Gibbons et al. | 717/159 |
| 7,287,052 B2 * | 10/2007 | Chen et al. | 709/203 |
| 7,305,671 B2 * | 12/2007 | Davidov et al. | 717/172 |
| 7,543,020 B2 * | 6/2009 | Walker et al. | 709/203 |
| 7,584,471 B2 * | 9/2009 | Bjare et al. | 717/178 |
| 2004/0034853 A1 * | 2/2004 | Gibbons et al. | 717/174 |
| 2004/0158813 A1 * | 8/2004 | Xia et al. | 717/116 |
| 2006/0235925 A1 | 10/2006 | Mauro et al. | |
| 2008/0222621 A1 * | 9/2008 | Knight et al. | 717/151 |
| 2009/0164564 A1 * | 6/2009 | Willis | 709/203 |

FOREIGN PATENT DOCUMENTS

| | | |
|---|---|---|
| WO | WO 03/017094 | 2/2003 |
| WO | WO 2004/095794 | 11/2004 |

OTHER PUBLICATIONS

International Search Report on International Application No. PCT/IL2006/001508 dated Jun. 1, 2007.

International Preliminary Report on Patentability for International Application No. PCT/IL2006/001508 dated Apr. 15, 2008.

* cited by examiner

METHOD AND SYSTEM FOR OPERATING APPLICATIONS FOR REMOTE TERMINAL DEVICES

This application is the National Stage Application of International Application Number PCT/IL2006/001508, filed Dec. 28, 2006, which claims the benefit of priority from U.S. Provisional Patent Application No. 60/754,290, filed Dec. 29, 2005.

FIELD OF THE INVENTION

The present invention relates to the field of mobile communication Applications. More particularly, the invention relates to a method and system for allowing a user of a terminal device to remotely operate upgraded and/or advanced applications without the need for upgrading the client side application or computational resources.

BACKGROUND OF THE INVENTION

Many modern mobile applications involve content provisioning, such as browsing, gaming, financial applications, music, ring tones and other multi media applications. On-Line applications such as browsing and Wireless Application Protocol (WAP) based applications that require data exchange with a data network allow the mobile devices to access the data required for further processing by the device. Mobile applications are normally developed with adaptation to the properties of a specific terminal device of a group of devices with similar computational capabilities, such as memory, processors, operating system, display size and graphical resolution, as well as the base set of application programming interfaces for resource-constrained terminal devices, such as Connected Limited Device Configuration (CLDC) that when coupled with a profile such as the Mobile Information Device Profile (MIDP), provide a Java platform for developing applications to run on devices with limited memory, processing power, and graphical capabilities. Current solutions for developers of such applications focus mainly in upgrading the developing tools for each terminal device.

The differences between the properties of different terminal devices entail design problems, since any attempt to make adaptations of an application to be compatible with several types of terminal devices restricts the capabilities of that application to comply with the terminal device which is the most resource-constrained. On the other hand, individual adaptation (also known as "porting", which is the process of adapting software to make it usable in a different environment) is costly and cumbersome, particularly when many new models are frequently added to the market. In addition, the development of applications for mobile terminal devices requires specific knowledge of the design tools, the limitations of each device and expensive testing verification processes, which are carried out on each device.

Another problem is related to the process required to add new applications and to upgrade or fix bugs in existing applications, which includes downloading the new applications or upgrading files into the device.

U.S. 2006/235925 (Rossotto et al.) discloses a multimedia service content provision method that uses wireless communication network, and involves interpreting received packets at client terminal, so as to obtain interactive presentation of multimedia service content, based on the service logic. According to this method, delivery packets that convey both the multimedia service contents and corresponding service logic are generated. The multimedia contents can thus be presented interactively at the terminal while new services can be designed on the server side and made available to the user terminals without modifications being required on the terminal side. However, this method uses a predetermined logic, which doesn't react in real-time to the state of the application and to the capabilities of the terminal device. More over, the proposed method still requires adaptation of the client-side application to each terminal device. In addition, Rossotto does not allow several users to interact with each another and influence, in real-time, the executed application at the terminal device of each other, as well as the content displayed to each one of them (e.g., interactions between employees of the same organization or users that participate in a common game).

Other existing platforms allow a user of a mobile device to develop mobile software over another platform (over .NET, for example) and then to adapt the client-side software to be able to be executed on that mobile device. However, this adaptation is done offline, thus still requiring the development, dispatch and installation of new client-side software for each update, fix operation or whenever a new application is added. In addition, developers who provide development tools that are added to the client-side application code generally increase the resources required from the terminal device, and are even sometimes useless for several models of devices with lower capabilities.

All the methods described above have not yet provided satisfactory solutions to the problem of providing design tools of mobile applications that do not require adaptation of the client-side application to each terminal device, and that react in real-time to the state of the application and to the capabilities of the terminal device.

It is an object of the present invention to provide a method and system for providing design tools of mobile applications that do not require adaptation of the client-side application to each terminal device.

It is another object of the present invention to provide a method and system for providing tools for execution, dispatch and platform installation of mobile applications that do not require adaptation of the client-side application to each terminal device.

It is another object of the present invention to provide design tools of mobile applications that react in real-time to the state of the application and to the capabilities of the terminal device.

It is a further object of the present invention to provide design tools of mobile applications that effectively exploits the capabilities of the terminal device.

It is yet another object of the present invention to provide design tools that allow maximization of the device capabilities, and developing and executing applications that are beyond the inherent device capabilities.

It is still another object of the present invention to provide design tools of mobile applications that can be easily implemented and simplify their verification process.

It is still another object of the present invention to provide design tools of applications that can be easily developed and implemented across platforms such as mobile devices and TV's.

Other objects and advantages of the invention will become apparent as the description proceeds.

SUMMARY OF THE INVENTION

The present invention is directed to a method for allowing a user of a mobile terminal device having predetermined computational resources and inherent capabilities to remotely develop and operate upgraded content delivery applications). A client-side application designed to be compatible with different terminal devices with different inherent capabilities and a corresponding remote application used for implementing the logic for each operated content delivery application and for performing, whenever required, most of the graphical processing according to the predetermined computational resources and inherent capabilities, are installed on the terminal device and on a server being in data communication with the terminal device, respectively. The server exchange data with the terminal device and the remote application dynamically splits the tasks to be performed by the content delivery application between the client-side application and remote application, according to its resources and inherent capabilities. The remote application adaptively processes, preferably in real-time, the content (multimedia, graphics etc.) and its associated logic and input data to be delivered to the terminal device according to its computational resources and inherent capabilities. The processed content is then transmitted to the terminal device over the data network and the content is further rendered by the client-side application. The client-side application responds to inputs from the user and/or to messages from the server or further connected devices.

The resources are the memory capacity, processing capacity, multimedia capabilities, graphical capabilities (display size, resolution, colors, 3d, processing power etc.), wireless features, such as BlueTooth (BT), GPS, J2ME capabilities (Java 2 Platform, Micro Edition) is a technology that allows programmers to use the Java programming language and related tools to develop programs for mobile wireless information devices such as cellular phones), add-on devices and add-on software, operating system capabilities, profile representing the specification of the terminal device, or any combination thereof.

Whenever a change in the logic of the application and/or in the content delivery application is required, only the remote application is updated on the server. Whenever required, the content may obtained by the server from external sources over the data network.

The data network may be the Internet; a cellular data network; a satellite data network; a wireless data network, a computer network, a digital data transfer network, a cable TV. The terminal device may be a cellular telephone, a PDA, a satellite phone, any electronic unit capable of executing software, a computing device capable of executing software or a TV or TV Set-top box.

Whenever a new content delivery application, a change in logic, update, or fix operation are required, a new remote application is installed on the server only, while allowing the generic client-side application to interact with the new content delivery application.

The content delivery applications may be electronic games, enterprise applications, multi-users applications, information rendering, 3-D graphical presentation, multimedia, voice, location based application, digital content, music or video/TV presentation.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
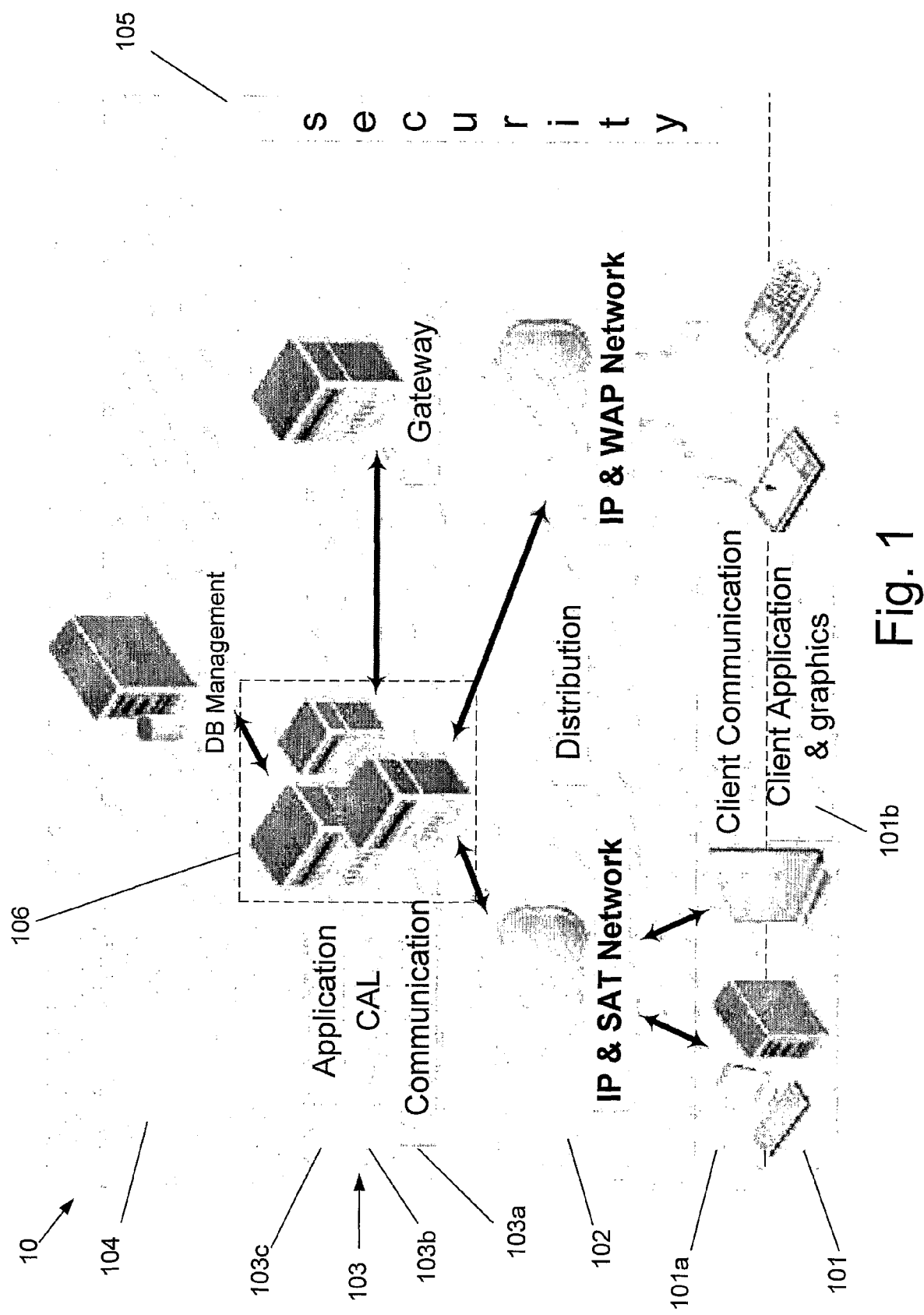
FIG. 1 schematically illustrates the architecture of a system for allowing a user of a terminal device to remotely operate upgraded and/or advanced application, according to the present invention.

According to the method proposed by the present invention, each content providing application is executed by a combination of a remote (server) application that runs on a server that is connected to a data network and a client-side component, which is generic and installed on each terminal device. The client-side component is designed to be compatible with many different terminal devices with different capabilities and will serve all types of applications that should be operated. Any required change, upgrade or adaptation of an application will not entail any change in the client-side component, but will be made in the remote application on the server. This way, the client-side component will be in data communication with the server, for exchanging data and instructions/requests and for transferring more heavy tasks to be executed by the server. The proposed solution reduces the time to market required for adaptation of the remote application to new devices, updating services, logic and content in the remote application, rather than in the device. This also allows development of new applications using programmatic environments that are more familiar to developers. Moreover, this allows maximization of the device inherent capabilities or capabilities that are provided by its accessories (e.g., add-on devices), and developing and executing applications that are beyond the device (limited) capabilities, such as CPU power and memory.

The capabilities of the remote server will be used for implementing the application logic for each operated application, execute portions of the required tasks and as a gateway to be in data communication with other information sources that are also connected to the data network. In addition, the server will perform most of the graphical processing according to the known capabilities of the terminal device and deliver, in real-time, the processed image or graphical data in a format that is optimized to the capabilities of the specific device, such as the display size, resolution, colors, intensity, etc. (and hence, no porting process is required).

FIG. 1 schematically illustrates the architecture of the system proposed by the present invention. The system 10 comprises several layers, such that each layer performs a required task. The security layer supports all other layers. These layers are the client layer 101, the distribution layer 102, the communication layer 103a, the Client Adaptation layer 103b, the (remote) application layer 103c, the database management layer 104 and the security layer 105.

The remote server 106 implements 3 layers:

The Communication Layer 103a: this layer includes an interface to the mobile terminal devices, using the services provided by the cellular providers. This layer also performs data communication with the client communication layer 101, so as to allow the remaining higher level layers to perform the application and the graphical and multimedia tasks, as well as other tasks (e.g., determining screen size, resolution, 3-D effects, colors etc.).

The Client Adaptation Layer (CAL) 103b: this layer is used to generate real-time, high resolution, multidimensional and multimedia presentations of complex data at high speeds) and performs real-time processing of graphical tasks and adaptation of the content to be delivered to a terminal device, according to its capabilities regarding voice, video, 3-D visualization and computer generated graphics. Content attributes adaptation to the capabilities of each terminal device maximally exploits them to enhance the presentation effects to the user.

The Application Layer 103c: this layer supports connectivity with client-side applications of different terminal devices, such as cellular devices, TV-s or devices that are connected via the Internet or other data network. In addition, this layer provides connectivity to external gaming servers, for incorporating gaming engines into the applications and to extend existing games into the mobile market, for implementing a desired application logic, for promoting product or services by pushed advertising content, for implementing disconnection logic, for connecting to the BackOffice Server (a dedicated family of bundled servers and operating system) of an enterprise for which an application is developed or of the cellular provider. The disconnection logic handles disconnection events, as may happen in cellular infrastructure. In such events, this logic uses the information regarding the stage of the application at the moment when disconnection occurs, and if the memory of the terminal device contains sufficient data and processed content (such as save files and graphical setup), this logic allows the user to continue interacting with the application locally, until interaction with the server is required.

The client layer 101 is designed to comply with a family of terminal devices with similar capabilities, such that it can easily run on each device of a corresponding family. The Client may be of a simple type that corresponds to more restricted-resource devices or of a more advanced type that corresponds to less restricted-resource devices, such as 3-G devices. The client layer 101 implements two layers:

The Client Communication Layer 101a: this layer includes the unique interface between the mobile terminal device and the remote server 106.

The Client Application Layer 101b: this layer includes the computational capabilities required to properly execute the client-side application on the mobile terminal device, which includes logical rules, voice, video, 3-D visualization and computer generated graphics. This layer is designed to be effective and flexible, so as to provide the required functionality without overloading the terminal device's resources. This layer also handles the interface, to data from the server, as well as inputs from the user. In addition, this layer optimizes performance by locally storing data files received from the server, so as to reuse it whenever possible and to locally execute operations, according to instructions from the remote server (such operations may include, for example, arithmetic operations, selection of objects, moving cursors etc.). As a default, rendering operations are performed by the remote servers unless a specific device provides indication to the remote server about its capabilities to perform them efficiently.

This distributed architecture descried above also allows providing the user advanced user interface and results that are much higher than the inherent capabilities of the terminal device itself. In addition, the proposed solution also allows multi-user client-side applications to interact with the remote server, so as to participate an interactive session, such as games etc.

Even tough the description above is related to a mobile terminal device, the method proposed by the present invention can be implemented to other remote devices which are not mobile or portable, but in order to provide a desired content, are connected to a remote server over a data network and that are considered to be resource-constrained (comparing to a desktop computer).

Therefore, the above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for allowing a user of a mobile terminal device having predetermined computational resources and inherent capabilities to remotely develop and operate upgraded content delivery application(s), comprising:
   a) installing, on said terminal device, a generic client-side application designed to be compatible with different terminal devices with different inherent capabilities;
   b) installing, on a server being in data communication with said mobile terminal device, a corresponding remote application for implementing the logic for each operated content delivery application and for performing, whenever required, most of the graphical processing according to said predetermined computational resources and inherent capabilities;
   c) allowing said server to exchange data with said terminal device;
   d) dynamically splitting, by said remote application, the tasks to be performed by said content delivery application between said client-side application and remote application, according to said computational resources and inherent capabilities;
   e) adaptively processing, by said remote application, the content and its associated logic and input data to be delivered to said mobile terminal device according to said computational resources and inherent capabilities;
   f) transmitting the processed content to said mobile terminal device over said data network;
   g) rendering said content by said client-side application; and
   h) allowing the client-side application to respond to inputs from the user and/or to messages from the server or further connected devices.

2. Method according to claim 1, wherein the resources are selected from the group:
   memory capacity;
   processing capacity;
   Graphical capabilities (display size, resolution, 3-D, processing power, colors etc.)
   wireless, BT, GPS add-on devices and associated software;
   Add on devices and add-on software
   J2ME capabilities
   Operating system capabilities;
   profile representing the specification of the terminal device; or
   any combination thereof.

3. Method according to claim 1, wherein whenever a change in the logic of the application and/or in the content delivery application is required, updating only the remote application on the server.

4. Method according to claim 1, wherein at least a portion of the content is obtained by the server from external sources over the data network.

5. Method according to claim 1, wherein the data network is selected from the group:
   Internet;
   cellular data network;
   satellite data network;

wireless data network;
computer network;
digital data transfer network;
cable TV.

6. Method according to claim 1, wherein the terminal device is selected from the group:
cellular telephone;
PDA;
satellite phone;
Electronic unit capable of executing software;
Computing device capable of executing software;
TV
TV Set-top box.

7. Method according to claim 1, wherein whenever a new content delivery application is required, installing a new remote application on the server, while allowing the generic client-side application to interact with said new content delivery application.

8. Method according to claim 1, wherein the content delivery application is selected from the group:
electronic games;
Enterprise applications;
Multi-users applications;
information rendering;
3-D graphical presentation;
multimedia;
voice;
location based application;
digital content;
music; and
video/TV presentation.

9. Method according to claim 1, wherein whenever a change in logic, update, or fix operation is required, installing a new remote application on the server, while allowing the client-side application to interact with said new content delivery application.

10. Method according to claim 1, wherein the adaptive processing is performed in real-time.

* * * * *